(12) United States Patent
Egner et al.

(10) Patent No.: US 6,616,143 B1
(45) Date of Patent: Sep. 9, 2003

(54) SYSTEM AND METHOD OF CONDUCTING A LOTTERY BASED GAME SHOW

(76) Inventors: Fritz Egner, c/o TCB of America L.C., 2000 Island Blvd., Williams Island, Aventura, FL (US) 33160; Antonio Geissler, c/o AUG, von-Simolin -Str. 1, 82402 Seeshaup (DE); Gregory Heath, c/o AUG, von-Simolin-Str. 1, 82402 Seeshaupt (DE)

( * ) Notice: Subject to any disclaimer, the term of this patent is extended or adjusted under 35 U.S.C. 154(b) by 0 days.

(21) Appl. No.: 10/154,420

(22) Filed: May 22, 2002

(51) Int. Cl.[7] .................................................. A63F 3/00
(52) U.S. Cl. ......................................... 273/430; 463/40
(58) Field of Search ..................... 463/40, 16; 273/430, 273/429, 431, 432, 138.1

(56) References Cited

U.S. PATENT DOCUMENTS

| | | | | |
|---|---|---|---|---|
| 5,108,115 | A | * 4/1992 | Berman et al. | ................. 463/9 |
| 5,813,913 | A | * 9/1998 | Berner et al. | ................. 463/40 |
| 6,004,206 | A | * 12/1999 | Fabri | ........................... 463/17 |
| 6,267,379 | B1 | * 7/2001 | Forrest et al. | ............... 273/431 |
| 6,340,159 | B1 | * 1/2002 | Giangrante | ................. 273/272 |
| 6,439,997 | B1 | * 8/2002 | Brasseur et al. | ............... 463/40 |
| 2002/0125637 | A1 | * 9/2002 | Leis | ........................... 273/272 |

OTHER PUBLICATIONS

The Original Game show Page: The game show A–Z; http://www.chris–lambert.com/GSPAZ.html, a listing of popular game shows, 28 pgs., Dec. 2002.*

Super Money Game TV Show, http://www.wilottery.com/supermgtvshow.cfm, 3 pgs., Mar. 2003.*

Venetian Las Vegas–Powerball Instant Millionaire Game Show from the Iowa Lottery, http://www.ialottery.com/games/scratchtickets/pbtvgameinstantmill/VenetianLasVegas.htm, 4 pgs., Oct. 2002.*

* cited by examiner

Primary Examiner—William M. Pierce
(74) Attorney, Agent, or Firm—Malloy & Malloy, P.A.

(57) ABSTRACT

A system and method for conducting a game show which is lottery based, at least to the extent of randomly selecting a predetermined number of contestants from a plurality of lottery participants each of which has purchased a chance of being a contestant. At least some or preferably all of the selected contestants are successively chosen as an active contestant to which a plurality of questions are offered. The questions are answered not by the active contestant but by a randomly selected one of a plurality of panel members incapable of being observed by the active contestant during the random selection and answering procedure, wherein a viewing audience, at least a portion of which may be defined by a television audience, concurrently view the active contestant and one or more of the panel members. A grand prize at least partially derived from the proceeds of the lottery is awarded to the active contestant to which the most correct answers have been credited.

26 Claims, 2 Drawing Sheets

SYSTEM AND METHOD OF CONDUCTING A LOTTERY BASED GAME SHOW

BACKGROUND OF THE INVENTION

1. Field of the Invention

The present invention relates to a system and method of conducting a lottery based game which is particularly adapted to be presented as a televised game show wherein a viewing audience may be defined both by a live audience and a television audience. A predetermined number of contestants are randomly selected from a plurality of lottery participants each of which have purchased the opportunity or chance to become a contestant.

2. Description of the Related Art

The popularity of lotteries continues to increase both in the United States and in many countries throughout the world. Specifically, lotteries are operated by the state or local government or in certain instances are privately operated. However, regardless of the sponsoring entity, the convenience of being able to purchase one or more lottery tickets at a fairly reasonable price allows many individuals to participate in the opportunity to win a significant amount of money or other "grand" prize. Also the existence and popularity of lotteries frequently benefit a variety of different worthy causes including charities and certain activities which are normally funded by state, local or federal taxes. Therefore, the ability to "contribute" to a worthy cause also encourages many people to play such games which would normally not be involved.

However, lotteries of the type generally known and practiced do have ceratin disadvantages which can be somewhat discouraging to many potential players. One such disadvantage is that many, if not most, of known lottery organizations provide for only a single level of play in the form of one ticket price or denomination. Therefore, if a player wishes to play at a higher level and thereby increase his opportunity to win an even greater amount of money or more valuable prize, the only option is to purchase more than one ticket. Even the purchasing of multiple tickets frequently does not significantly increase a player's odds of winning because of the extremely large number of lottery tickets or chances which are normally distributed or sold, especially in lotteries which are operated within a large geographical region such as a state or nation.

Due to the popularity of a lottery type gaming system, attempts have been made to incorporate the basic playing procedure of a lottery into another format which is also extremely popular. This additional format is well known as quiz shows or game shows. Typically, such game shows are broadcast over television and/or radio and provides an extremely large broadcast audience the opportunity to observe one or more contestants win a significant amount of money or other prizes. The procedures involved in such game shows typically include one or more contestants answering a plurality of questions submitted to them individually by a host or commentator.

The aforementioned attempts to combine the game show format with the lottery gaming system or procedure include the use of an interactive television facility which provides at least some type of participation of at least some of the television audience. For example, one type of game involves the use of numerous remote computers or television receivers, located throughout a given geographical area, which communicate with a central station. A customer seeking to play or participate in the game being televised may pay or otherwise be charged a certain entry fee of a few dollars and the game proceeds in accordance with certain rules.

The popularity of television is also realized in the more conventional broadcast of the random chance selection of the specific numerals which make up a winning lottery number. This may involve, for example, operating a machine loaded with a plurality of balls each of which has an eligible numeral marked thereon. The machine containing such balls randomly and successively selects a winning number from all of the balls representing all of the various numerals. This selection process is broadcast on local or statewide television stations so that contestants can watch to see if there numbers have been selected.

In light of the above, it would be highly desirable to produce and televise a lottery based game incorporating a quiz show or game show type of format, wherein the actual contestants are chosen on a lottery type basis. Further, the selected contestants, being randomly chosen, all may win a specific money award with the additional opportunity of proceeding in the progress of the "game show" to win additional money awards and possibly a grand prize. In such an improved lottery based game show, proceeds from the lottery would represent at least a portion of the monies distributed to the contestants as awards and/or the grand prize. Also, the monies used for the grand prize and other money awards would be guaranteed by the sponsor of the lottery, such as a state and/or federal government. Further, the improved and preferred lottery based game of the type set forth in greater detail hereinafter would be conducted over any predetermined geographical area, such as one or more states or an entire nation. Also, the lottery based game would be conducted periodically, such as two times yearly, thereby providing potential lottery participants with a certain amount of anticipation. In addition, the cost of the individual chances would be relatively inexpensive, especially when the lottery based game was conducted over an extensive area such as nationwide as set forth above. Finally, the excitement and appeal of an improved lottery based game could be further enhanced by incorporating all of the special effects, lighting set presentations, etc., for which the televison industry is noted.

SUMMARY OF THE INVENTION

The present invention is directed to a lottery based game which is particularly adapted to be the subject of a televised game show and which is preferably conducted on a site which includes television broadcast facilities capable of accomplishing this end. Accordingly, when the game is being conducted, a viewing audience may be defined by both a live audience, having live access to the site and the activities being conducted thereat, and a television audience. In addition, the live audience, when present, will to at least some extent comprise a participating factor in the playing of the lottery based game by virtue of supplying laughter, applause or like reactions to the various activities of which lottery based game is comprised.

As indicated above, the game is at least partially based on a lottery to the extent that a predetermined number of contestants will be chosen to actively be a part of the game. In addition, the system and method of the present invention conforms to all local, state and government lottery regulations, particularly emphasizing the fact that all individuals which purchase or otherwise have authorized possession of a "lottery chance" or opportunity are eligible to participate actively. The predetermined number of contestants are randomly selected from a plurality the of lottery participants. Each of the lottery participants are defined by those individuals who have purchased or otherwise have authorized possession of at least one chance or opportunity to become a contestant. The selection procedure for determining the predetermined number of contestants may comprise a typical or conventional random drawing or other procedure which determines an unbiased selection of the predetermined number of contestants. As will be apparent hereinafter, the actual number of contestants chosen may vary based on a number of factors including, but not limited to, the intended length of the broadcast time or period during which the game show will be conducted. Once the predetermined number of contestants have been randomly selected, they are gathered at the common site or television set.

Also, a predetermined number of individuals are chosen to serve on a panel which will have a specific purpose and function in the conducting of the lottery based game, as described in greater detail hereinafter. The panel members, in order to enhance the appeal to both the television audience and the live audience, may be celebrities. Moreover, for purposes of greater versatility and further audience appeal, each of the panel members may be associated with a different field of interest or expertise. Naturally, as is common with television programs throughout the world, celebrity figures have a tendency to increase the size for the television viewing audience possibly for no other reason then their celebrity status. However, because of the nature of the method of conducting the subject lottery based game, it may be desirable for each of the predetermined number of selected panel members to possess a certain expertise relative to a given area or about a given subject.

By way of example only, the panel members may comprise celebrities from the field of sports, entertainment, authors, etc. However, it is also to be understood that the panel members may, depending upon the preferences of the viewing audience, all be selected from a common field, such as the entertainment industry, in order that the celebrity status of the panel appeal to a wider based television audience. As will be more apparent hereinafter, selection of the various panel members from varied fields of expertise or interest may prove to be more practical or beneficial to the successful conducting of the lottery based game.

As expected, the goal of the selected contestants and the attractiveness of purchasing a lottery chance or opportunity to become a contestant, is to win or be awarded a grand prize. The grand prize is preferably in the form of an extremely large money award, preferably in the millions of dollars or the equivalent amount in any foreign currency of a country in which the lottery based game system and method of the present invention is practiced. In addition, the sponsors of the lottery guarantee the full amount of the grand prize and other money awards advertised or offered by underwriting such amounts. Also, the opportunity exists for each of the selected contestants, who are not fortunate enough to win the grand prize, to at least be granted a money award for their initial random selection as a contestant. In addition, the possibility of winning additional money awards for the successful progression through the various steps of conducting of the game will also be an inducement.

In the progression of the lottery based game, at least some but preferably all of the contestants are randomly and successively chosen to serve as an "active contestant". A plurality of questions are offered to the then current active contestant. However, the current active contestant does not directly provide the answer to the question but rather allows for the random selection of one of the predetermined number of panel members to provide the answer to the question. Accordingly, it should be clear that the obtaining of a number of correct answers depends, at least to some extent, on luck in the random choice of the panel member who knows the correct answer. The game does not depend on the specific knowledge of the active contestant as will be further clarified hereinafter. The active contestant will be credited with each correct answer and will be offered successive questions until the active contestant chooses not to answer a current question or where the last offered question resulted in a panel member presenting an incorrect answer.

The questions are preferably on the form of multiple choice questions, wherein a plurality of answers, one of which is correct, are provided. The randomly selected panel member chooses one of the multiple answers indicated. However, it is within the intended scope of the present invention to offer the questions in a variety of forms other than multiple choice, when such is preferable or practical. Naturally, because the potential winnings of the active contestants continually increase as the offered questions are correctly answered, successively offered questions may increase in difficulty, thereby further adding to the strategy of the game. Strategy enters, at least in part, at this point due to the fact that the active contestant will want to be credited with as many correct answers as possible. However, the active contestant realizes that an incorrect answer will remove him or her from the opportunity to win the grand prize as well as prevent the active contestant from winning all the accumulated money awards resulting from the previous correct answers.

Each correct answer credited to a then active contestant will result in an award being granted, preferably in the form of a money award of a preset amount. The active contestant will try to accumulate as many money awards as possible, and accordingly, attempt to be credited with as many correct answers as possible in order to become a "leading contestant" in the competition for the grand prize. However, the presentation of an incorrect answer to any offered question will result in the then active contestant losing all of the previous award monies having been granted. That active contestant will be eliminated from the game and will forfeit any chance of becoming the aforementioned leading contestant. Naturally, after the presentation of an incorrect answer, no more questions will be offered to that active contestant.

Therefore, the leading contestant may be defined by one of the active contestants which has been credited with the most correct answers, and accordingly, has the largest amount of money awards accumulated. Another feature of the lottery based game is the fact that any current leading contestant can be displaced by an active contestant which is credited with more correct answers than the current leading contestant.

The entertainment factor and potential of the lottery based game system and method of the.present invention is tremendously enhanced by defining the relative positions of the active contestant and the plurality of panel members in a unique arrangement. More specifically, both the active contestant and the panel members are capable of being observed by both the live audience and by the television audience, dependent of course upon the coverage of the television facilities associated with the game show site or television set. However, the active contestant is not allowed to observe the panel members during the random selection process of the individual panel member to answer a question. Also, the position of the active contestant is such as to prevent his/her viewing the panel members during the actual answering of the offered question. Accordingly, the viewing audience has the benefit of observing the body language, facial expressions and other demonstrations being conducted by each of the panel members in representing their attitude of being chosen to answer a given question. Concurrently, a facial expression and/or body language of the active contestant may be somewhat quizzical or puzzlingly due at least in part to the reaction of the live audience to the actions and demonstrations of the panel members.

By way of example only, a particularly difficult question may be presented to the then active contestant. Because of the degree of difficulty, the various panel members knowing that they are not being observed by the active contestant, may perform a variety of demonstrative acts indicating their reluctance or inability to answer a given question. The live audience, having the benefit of observing the panel members may react with laughter, applause, cheering, etc. The active contestant, not being able to observe the panel members but being exposed to the response of the live audience, will be aware that some activities are being performed by the panel members but will be unaware that all or some of the panel members do not want to be faced with answering a particularly difficult question. The television audience will be able to concurrently view the active contestant and all of the panel members or at least the one panel member which has been randomly selected to answer the question. At the same time the television audience will have the benefit of enjoying the reaction of the live audience and thereby be further entertained by the entire proceedings.

The system and method of the lottery based game of the present invention comprises other active parts and procedures including the granting of a predetermined number of "alternatives" or "wild cards" to the then active contestant. The alternatives are preferably, but not necessarily, two in number. The alternatives, when selected by the active contestant, may allow an alternative procedure to the first choice of the panel member randomly selected to answer a given question. Anyone or both of the alternatives may be activated or instigated at the discretion of the active contestant and may be based in part on the audiences' reaction of a panel member which has been randomly selected.

Another feature of the system and method of the lottery based game is the determination of the grand prize as a significantly large amount of money, preferably in the millions of dollars or an equivalent amount of foreign currency, when the game is played in a country other then the United States. The grand prize is derived, at least in part, from the purchase money contributed by all of the lottery participants when purchasing a chance or opportunity to become a contestant and is guaranteed by the sponsor of the lottery based game which may be a local, state or federal government. Similarly, the derivation of all of the money awards awarded to all of the active contestants may come from the total money proceeds of selling lottery chances.

Therefore, the lottery based game of the present invention will have wide interest since purchase of the lottery chances or opportunities may be offered to all of the population of a given country or any other geographical area determined by the operators of the lottery based game. A direct and significant interest will develop which will have a likely tendency of increasing the size and interest of the television audience since any member thereof that participated in the lottery could have been chosen as a contestant. In addition, such nationwide or other geographically defined lotteries will be conducted on a periodic basis, such as semi-annually, resulting in a subsequent lottery based game being nationally televised on a periodic basis following the closing of the lottery.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
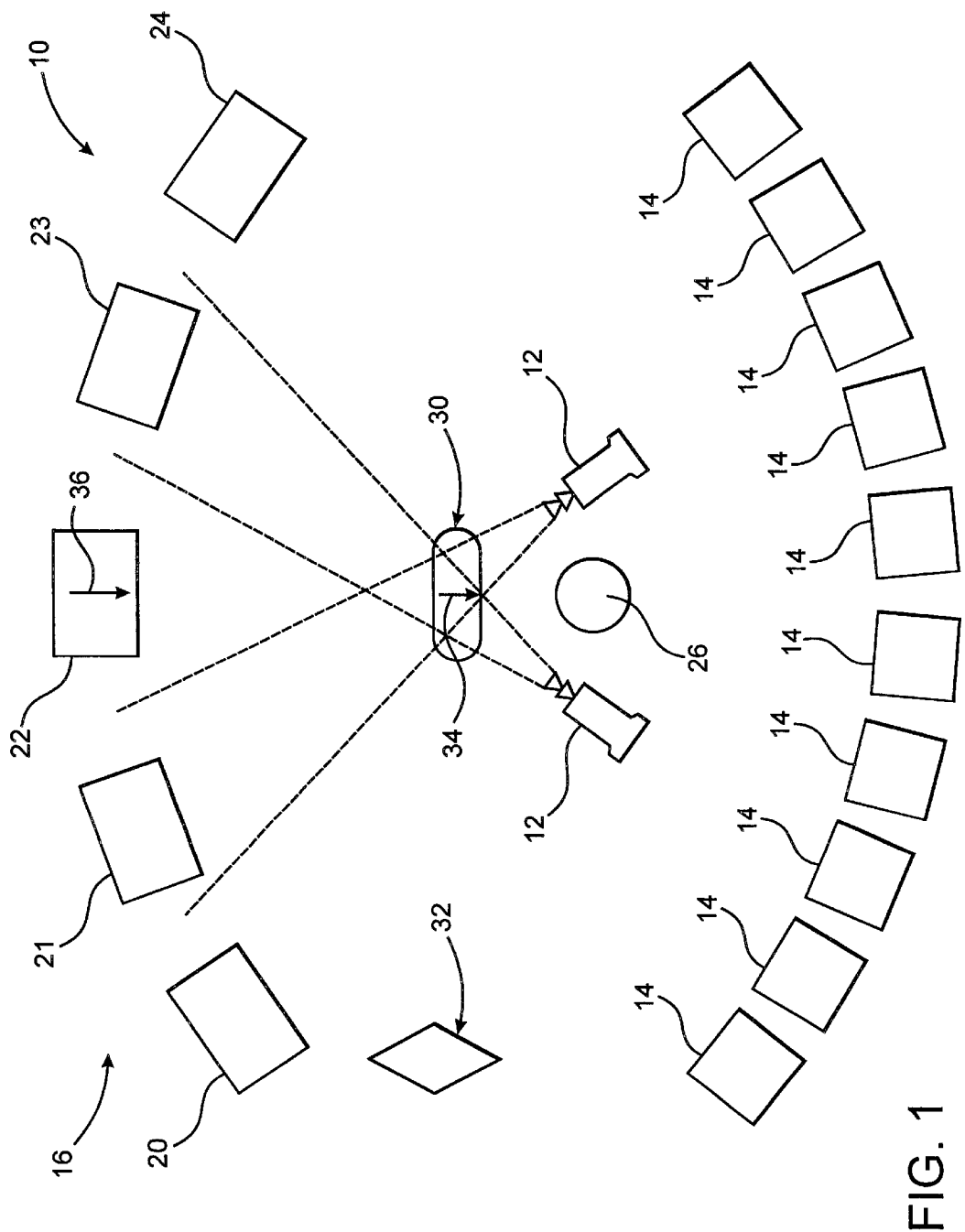
FIG. 1 of the drawings is a schematic representation demonstrating the system, method and other operational components of the lottery based game of the present invention.
Figure 2:
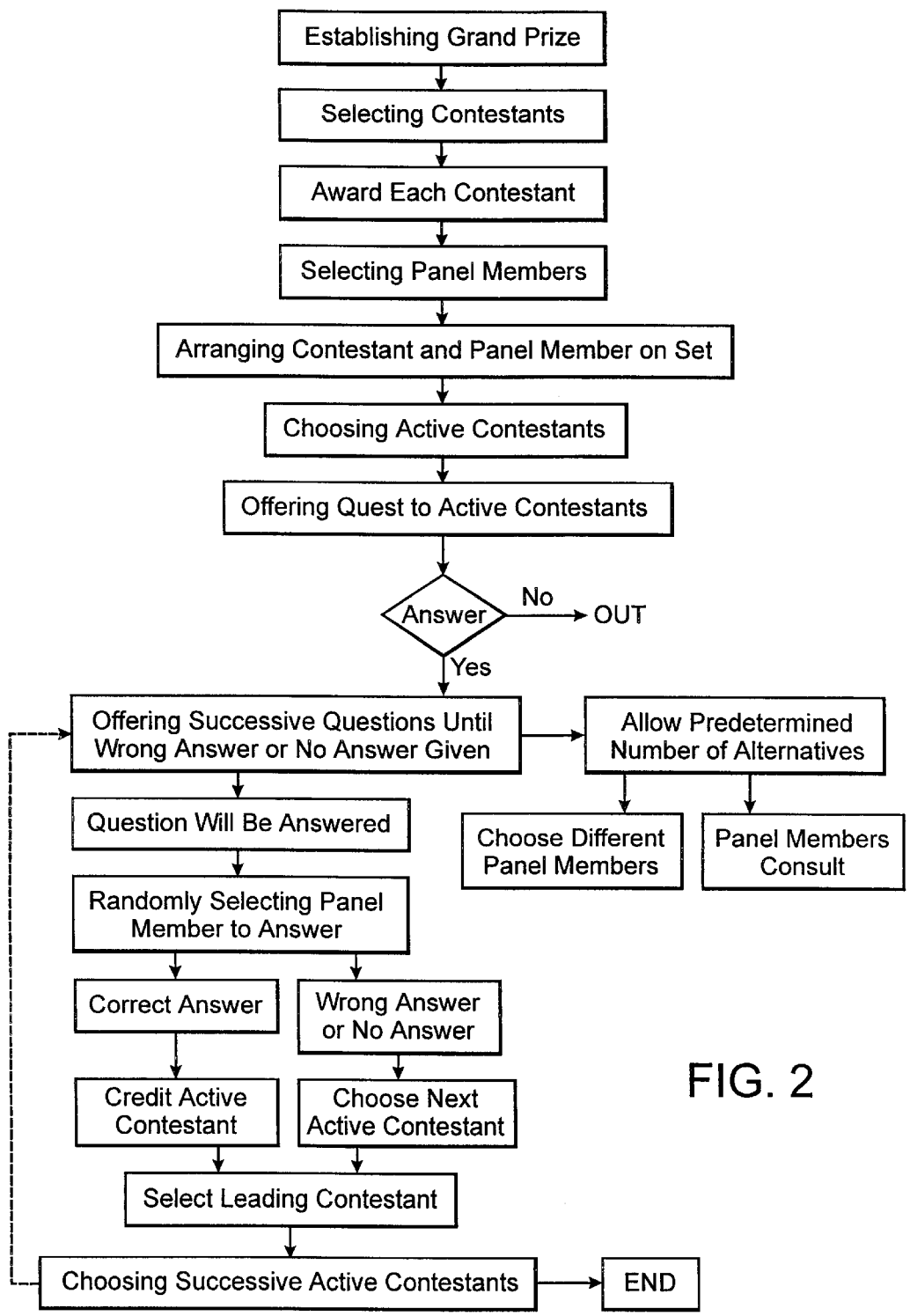
FIG. 2 is a flow chart schematically representing the various steps of the system and method of the present invention.

As shown in the accompanying FIGURE, the present invention is directed to a system and method of conducting a lottery based game. Further, and as schematically demonstrated, the lottery based game of the present invention is particularly adapted to be televised and thereby observed and enjoyed by a viewing audience which may comprise both a live audience and a television audience.

More specifically, the lottery based game show is conducted and performed at a site or television set generally indicated as 10. Being televised, the site 10 includes a plurality of television cameras 12 which may vary in number and location and which are collectively positioned so as to provide observation of all of the participants, set structures, special effects, lighting, audio display and performance, etc. The site or television set 10 also comprises a location for a plurality of contestants each of which are indicated as 14. Also, provision is made for a panel generally indicated as 16, wherein each of a predetermined number of panel members are indicated as 20 through 24. At least one preferred embodiment of the present invention comprises the random selection of ten contestants 14 and the selection of five panel members 20 through 24.

It is emphasized that the number of contestants 14 may vary, dependent, at least in part, on the length of time the lottery based game show is intended to be conducted and broadcast. Also, the number of contestants 14 should be sufficiently large so as to satisfy the sense of fairness of the potentially much larger number of lottery participants from which the predetermined number of contestants 14 are randomly chosen, as will be explained in greater detail hereinafter. Similarly, the number of panel members 20 through 24 may also vary but should be such as to facilitate the possibility of each of the panel members 20 through 24 being able to participate in the conducting of the lottery based game without any one or more of the panel members being required to repetitively participate to an inordinate extent.

The length of the game and accordingly the length of the broadcast may also vary. However, in one preferred embodiment of the present invention the game is intended to be conducted and broadcast on consecutive nights, over approximately a weeks period of time. Each nightly broadcast will consume approximately one hour of total broadcast time. As is conventional in the television industry the actual game may be broadcast during 46 minutes of the broadcast hour, wherein the remaining time is reserved for advertisement, introduction, credits etc. Also, the lottery based game, which as set forth above may be sponsored by local, state or federal governments, will guarantee to the public at large that a lottery will be conducted at least twice a year and that the lottery based game show will be televised or otherwise conducted at some point relatively soon after the lottery has been completed and the plurality of contestants 14 have been randomly chosen.

Other operative features of the lottery based game of the present invention includes the provision of a host or commentator 26 which will actively direct the progress and procedures associated with the playing of the lottery based game. More specifically, the duties of the host 26 will include offering to the active contestant 30 a plurality of questions which are preferably, but not necessarily multiple choice questions. As also will be explained, the site 10 or television set includes the designation of an "active" contestant 30, randomly selected from the predetermined number of contestants 14. Also, a "leading" contestant generally indicated as 32 will be designated and segregated from both the predetermined number of contestants 14 and the then current active contestant 30 at least for purposes of emphasizing to the viewing audience the current status of the leading contestant and at least to some extent the progress of the lottery based game.

In conducting the lottery based game of the present invention, a lottery is conducted on a national or other geographical basis, wherein a plurality of opportunities or chances to become a contestant 14 are offered for purchase. The proceeds derived from the purchase of the lottery opportunities or chances at least partially defines the source of the grand prize offered to the eventual winning contestant 14 and are guaranteed by the sponsor of the lottery, which may be a local, state or federal government. The monies derived from the sale of lottery chances may also define the source of a plurality of other awards granted to certain ones or all of the contestants 14, as they progress through the participation of the lottery based game system and method of the present invention.

The predetermined number of contestants 14 are randomly chosen from the lottery participants by a random drawing or any other applicable procedure which assures that the selection of the individual contestants 14 is accomplished on a truly random basis. Once selected, the contestant 14 are collected at the site or television set 10 and assume the positions indicated. In addition, the predetermined number of panel members 20 through 24 are selected by considering a variety of different factors.

For example, the various panel members 20 through 24 may enjoy a certain celebrity status and may preferably be selected based on their association with a variety of different fields of expertise or interest. However, it is within the intended scope of the present invention that each of the panel members 20 through 24 be selected for any number of reasons. As a further example, it is commonly recognized in the television industry that the individual celebrity status may be a more significant factor in attracting a larger television audience than perhaps lesser known panel members. Still, it may very well be considered that the functioning of the game will be better facilitated by varying the particular fields of interest or expertise with which the predetermined number of panel members 20 through 24 may be associated.

While the specific arrangement of the site or television set 10 may vary greatly depending upon production facilities, cost, desired special effects, number of contestants and panel members, etc. One feature of the present invention is the relative positioning or location of the active contestant 30 with that of the various panel members 20 through 24. As depicted in the FIG. 1, the embodiment of the site 10 indicates that the location of the active contestant 30 comprises a substantial "center of attention" in terms of audience observation and viewing direction of the plurality of contestants 14 as well as the plurality of panel members 20 through 24. Also, any of the contestants 14 which occupy the status of active contestant 30 will be facing in a direct indicated by directional arrow 34 towards an assumed position of the television cameras 12 and the host or commentator 26. In addition, each of the panel members will be oriented to be facing inwardly towards the active contestant 30 as indicated by directional arrow 36. This relative positioning allows each of the panel members to view the active contestant 30 while preventing the active contestant 30 from viewing any one of the panel members 20 through 24. Moreover, the live segment of the viewing audience can be distributed as practical throughout the site or television set 10. However, the live audience should be positioned so they can concurrently view both the active contestant 30 and the plurality of panel members 20 through 24. In particular, the television audience, viewing the system and method of the lottery based game through the television cameras 12, will be able to view substantially the entire site or television set 10 and in certain instances to be described in greater detail hereinafter, will be specifically exposed to a concurrent viewing of the then active contestant 30 and at least one of the panel members 21 for reasons which will become apparent hereinafter.

As set forth above, the conducting of the lottery based game comprises the random selection of the contestants 14 and the determination of the panel members 20 through 24. Subsequently, the game comprises a random selection, such as by computer or other applicable means, of one of the contestants 14 to assume the status of active contestant 30. The active contestant 30 will be offered a plurality of questions separately and successively. The questions will be continuously offered to the active contestant 30 as long as correct answers are provided to the individual questions.

An interesting deviation of the lottery based game of the present invention from known prior art game shows is that the active contestant 30 does not answer the individual questions. Rather such individual questions are answered by one of the panel members 20 through 24 which is randomly selected, as by computer or other applicable means. Each successive question offered to the active contestant 30 will result in the random selection of one of the plurality of panel members 20 through 24. If and when an incorrect answer is given by the randomly selected panel member 20 through 24, the active contestant 30 "loses" the game and no longer can participate in the progression of the game. However, the active contestant at any point subsequent to being credited with a correct answer to the first question asked can elect to stop answering questions.

Strategy comes into play in the conducting of the lottery based game of the present invention by each of the contestants 14 realizing that the grand prize will be awarded to the contestant that is credited with the largest number of correct answers. As the individual contestants 14 are randomly and successively chosen to assume the status of active contestant 30, they can only assume the higher status of leading contestant 32 upon being credited with a higher number of correct answers than any of the preceding active contestants 30.

By way of example, one of the first or preceding contestants 14 may have credited to him or her five (5) correct answers while participating as an active contestant 30 and as a result is awarded the higher status of leading contestant 32. Accordingly, any subsequent contestant 14 which assumes the active contestant status 30 and which reaches the five (5) correct answer level will not become the new leading contestant 32. The current leading contestant 32 will not be displaced as such, unless the then active contestant 30 accomplishes at least an additional one or sixth (6) correct answer from the randomly selected panel member 20 through 24. Once this event occurs the previous leading contestant 32 is displaced by the new leading contestant who has just been credited with a higher number of correct answers, as set forth above.

In a preferred embodiment of the present invention, each of the plurality of contestants 14 which have been randomly selected from the lottery participants will be successively randomly chosen to assume the status of active contestant 30. This will allow each of the selected contestants 14 to have an opportunity to be credited with as many correct answers as possible. However, and again for purposes of strategy, any active contestant 30 may not want to proceed further than a given number of correct answers. This would be based on the fact that the active contestant 30 has just achieved a larger number of correct answers than the current leading contestant 32. Alternatively, the current active contestant 30 may believe that the question just offered is too difficult for any of the panel members to answer correctly. A voluntary election by the current active contestant 30 would allow him or her to stop "answering" questions and keep all of the accumulated money awards obtained up until the time of voluntary removal even though the higher status of leading contestant 32 has not been obtained.

However, while in at least one preferred embodiment of the present invention provision is made to randomly chose all of the selected contestants 14 as an active contestant, it is recognized that a predetermined time limit may be set for the broadcast of the game show, such as one week. In such a circumstance where a plurality of the active contestants take an inordinate length of time to answer questions, such as when a plurality of correct answers are given, it is possible that not all of the contestant 14 will be randomly selected to become an active contestant. An alternative to this embodiment would be to extend the broadcast time, in terms of extended nightly broadcasts, until all of the predetermined number of selected contestants 14 have been given an opportunity to become the active contestant 30.

Another factor present in the preferred embodiment of the system and method of the lottery based game of the present invention comprises a greatly enhanced entertainment capability due at least in part to the relative locations of the active member 30 and the plurality of panel members 20 through 24 relative to one another and to the viewing audience. More specifically, since the answer to any given question is presented by a randomly selected panel member 20 through 24 and further in view of the fact that the active contestant 30 is not able to visually observe these panel members during the selection process or the answering of the offered questions, various activities may be demonstrated by the panel members 20 through 24 of which the active contestant 30 is not aware.

By way of example, each or all of the panel members 20 through 24 may be demonstrating a plurality of facial expressions, body language, sign language, etc. indicating their reluctance or inability to answer a given question. The viewing audience comprising both the live audience and the television audience are aware of the antics of the one or more panel members 20 through 24 and may concurrently view the active member 30 as well as the one or more members of the panel 16. The reaction of the live audience in terms of laughter, cheering, applause, etc. provided as a result of the antics of the panel members may further confuse the active member 30 since he is not allowed to observe any of the members of the panel 16 during their individual random selection or during the answering procedure. Accordingly, the viewing audience is capable of a concurrent observation of the puzzled reaction of the active contestant 30 and the demonstrative antics of the panel members 20 through 24.

Based at least in part on the reaction of the live audience, the active contestant 30 may be hesitant to allow a selected panel member 20 through 24-to answer a given question. Accordingly, since the correct answer is of utmost importance to the active contestant 30, he/she is given a predetermined number of "alternatives" or "wild cards". Preferably the alternatives are limited to two in number, and may be exercised by the active contestant 30 during his participation as such. One of these alternatives could be a random selection of a different one of the panel members 20 through 24 from the one originally chosen. However, using an alternative to choose another panel member to answer an offered question may in fact result in the very same panel member being selected due to the fact that the selection of the panel members is made on a truly random basis. Another, one of the alternatives may be allowing a consultation or conference between all of the panel members 20 through 24 in order to increase the chances of arriving at a correct answer. Once any one or all of the alternatives have been exhausted the active contestant 30 can no longer rely thereon.

Because of the lottery basis of the game show of the present invention, a predetermined money award will be given to each of the "winning" contestants 14 randomly selected from the lottery participants. This award will be permanent in nature in that the contestants will never have to relinquish this money award amount. Further, each correct answer credited to the active contestant 30 will result in an additional money award. The presentation of an incorrect answer will cause the then active contestant 30 to be removed from the remainder of the game and further cause him/her to relinquish all accumulated money rewards resulting from the previously correct answers provided. Further, if the active contestant 30 voluntarily decides to stop answering the offered questions, he/she may keep all the money awards granted based on having correct answers to offered questions credited to him/her. Finally, the grand prize will be significantly greater and may be derived from the majority of the proceeds from the sale of the lottery chances in the nationwide or other geographically defined lottery, as previously described.

Yet another preferred embodiment of the lottery based game show system and method of the present invention comprises the provision of an interactive phase. In this embodiment, the television audience may participate in the game show, at least in part, by establishing communication with the site 10 by telephone or by using a computer facility, such as over the Internet. In such instances, certain limitations may be placed on the television audience, such as by not being able to win the grand prize. Specific rules and procedures for interactive television audience participation would be determined on an individual basis, dependent in part on how the sponsors of the lottery based game show wish to further define this additional preferred embodiment.

Nationwide interest will be increased and maintained in the lottery based game show of the present invention by virtue of the fact that any person willing to participate in the lottery and purchase one or more opportunities to become a contestant 14 may eventually win the ultimate grand prize. Also, the lottery may be conducted through out the intended geographical area on a regular or periodic basis such as two to three times annually.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of conducting a lottery based game in the presence of a viewing audience, said method comprising:
    a) randomly selecting a predetermined number of contestants from a plurality of lottery participants,
    b) determining a predetermined number of panel members and locating the contestants and the panel members at a common site observable by the viewing audience,
    c) choosing an active contestant on a random basis from the predetermined number of contestants,
    d) disposing the active contestant in a predetermined location at the common site which allows concurrent observation by the viewing audience of the active contestant and at least some of the panel members,
    e) offering a plurality of questions to be answered successively wherein a next successive question to the active contestant is offered only when a first or previous question has been correctly answered,
    f) randomly selecting one of the panel members to answer a currently offered question and crediting the active contestant with a predetermined award when a correct answer is provided,
    g) subsequently choosing at least some of the contestants as a next active contestant,
    h) choosing a predetermined number of succeeding active contestants and offering each a plurality of questions,
    i) continuing to offer each of the successive active contestants a question as long as correct answers are provided by randomly chosen panel members, and
    j) awarding a grand prize to the active contestant who is credited with the most correct answers.

2. A method as recited in claim 1 comprising defining each of the lottery participants as those who purchase at least one chance to become a contestant.

3. A method as recited in claim 2 comprising presenting a predetermined money award to each of the contestants chosen from the plurality of lottery participants.

4. A method as recited in claim 2 comprising establishing the grand prize at least in part from the money proceeds derived from the purchase of chances by the plurality of lottery participants.

5. A method as recited in claim 1 comprising allowing each active participant a predetermined number of alternatives to the panel member randomly selected to answer the plurality of offered questions.

6. A method as recited in claim 5 comprising limiting the number of alternatives to two alternatives for all of the plurality of questions offered to each active contestant.

7. A method as recited in claim 5 comprising defining at least one of the alternatives as a random selection of another panel member.

8. A method as recited in claim 7 defining at least one of the alternatives as allowing all of the panel members to consult with one another to determine a correct answer.

9. A method as recited in claim 5 comprising defining at least one of said alternatives as allowing all of the panel members to consult with one another to determine a correct answer.

10. A method as recited in claim 1 comprising televising at least a portion of the lottery based game and defining the viewing audience to at least partially include a television audience.

11. A method as recited in claim 10 further defining the viewing audience as including a live audience.

12. A method as recited in claim 11 comprising establishing the predetermined location of the active contestant to prevent the active contestant from viewing the panel members at least during the period when the one panel member is randomly selected to answer the question.

13. A method as recited in claim 12 comprising televising a concurrent viewing of the active contestant and the panel member randomly selected to answer a given question.

14. A method as recited in claim 13 comprising televising a concurrent viewing of the active contestant and all of the panel members during the random selection of the panel members for the eventual selection of a panel member to answer the given question.

15. A method as recited in claim 1 comprising randomly choosing each of said predetermined number of contestants as the active contestant on a successive basis.

16. A method as recited in claim 15 comprising designating the active contestant having been credited with the most correct answers as a leading contestant.

17. A method as recited in claim 15 comprising displacing a current leading contestant with another subsequent active contestant that becomes credited with more correct answers than the current leading contestant.

18. A method as recited in claim 17 comprising allowing a current leading contestant to remain as such upon an active contestant being credited with an equal amount of current answers.

19. A method as recited in claim 18 comprising providing an additional money award for each correct answer credited to each active contestant unless an incorrect answer is given to a last offered question.

20. A method as recited in claim 19 comprising allowing each active contestant to keep the total additional money award as long as no incorrect answer was given to an offered answer.

21. A method as recited in claim 20 comprising allowing each active contestant the choice of discontinuing as long as at least one correct answer has been credited to the active contestant and no incorrect answers have been provided by the panel members.

22. A lottery based game show system comprising:
    a) a plurality of lottery participants each of which have purchased at least one chance,
    b) a predetermined number of contestants randomly selected from said plurality of lottery participants,
    c) a predetermined number of panel members each associated with a field of interest,
    d) a plurality of active contestants successively and randomly chosen from said predetermined number of contestants,
    e) a plurality of questions offered to each of said active contestants, wherein successive questions are only offered to the current active contestant upon a last offered question being answered correctly by a randomly selected one of said panel members, f) a leading contestant defined by anyone of the active contestants with the most credited correct answers, and g) a grand prize awarded to the leading contestant subsequent to the final active contestant being questioned.

23. A system as recited in claim 22 further comprising a site on which the lottery based game is conducted, said site being observable to a viewing audience.

24. A system as recited in claim 23 further comprising television broadcast facilities associated with said site, wherein said viewing audience is at least partially defined by a television audience.

25. A system as recited in claim 24 wherein said active contestant and said panel members are relatively positioned on said site to allow concurrent viewing of said active contestant and at least said one panel member randomly selected to answer an offered question.

26. A system as recited in claim 25 wherein said active contestant and said one panel member are relatively disposed on said site to prevent said active contestant visual observation of said panel members during random selection for and answering of the questions offered to said active contestant.

* * * * *